(12) United States Patent
Nemoto (10) Patent No.: US 9,796,384 B2
(45) Date of Patent: Oct. 24, 2017

(54) VEHICLE TRAVEL CONTROL APPARATUS

(71) Applicant: TOYOTA JIDOSHA KABUSHIKI KAISHA, Toyota-shi, Aichi (JP)

(72) Inventor: Yusuke Nemoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/915,783

(22) PCT Filed: Sep. 1, 2014

(86) PCT No.: PCT/JP2014/073595
§ 371 (c)(1),
(2) Date: Mar. 1, 2016

(87) PCT Pub. No.: WO2015/034074
PCT Pub. Date: Mar. 12, 2015

(65) Prior Publication Data
US 2016/0200320 A1  Jul. 14, 2016

(30) Foreign Application Priority Data
Sep. 6, 2013 (JP) ................... 2013-185684

(51) Int. Cl.
*B60W 30/16* (2012.01)
*B60W 50/00* (2006.01)

(52) U.S. Cl.
CPC ..... *B60W 30/16* (2013.01); *B60W 2050/0008* (2013.01); *B60W 2050/0012* (2013.01);
(Continued)

(58) Field of Classification Search
CPC ......... B60W 30/16; B60W 2050/0008; B60W 2050/0012; B60W 2550/20;
(Continued)

(56) References Cited

U.S. PATENT DOCUMENTS

2010/0299044 A1  11/2010 Miyake et al.
2013/0041567 A1   2/2013 Yamashiro

FOREIGN PATENT DOCUMENTS

JP    H09-282599 A   10/1997
JP    H11-13507 A    1/1999
(Continued)

*Primary Examiner* — Michael D Lang
(74) *Attorney, Agent, or Firm* — Oliff PLC (57) ABSTRACT

A vehicle travel control apparatus includes: a sensor that obtains preceding vehicle information representing a status of a preceding vehicle; a communication apparatus that obtains preceding vehicle acceleration/deceleration information, which is generated in the preceding vehicle, via communication with the preceding vehicle; and a controller that generates a first target value related to a target acceleration/deceleration value of a host vehicle based on the preceding vehicle information and a second target value related to the target acceleration/deceleration value of the host vehicle based on the preceding vehicle acceleration/deceleration information, and controls acceleration/deceleration of the host vehicle based on the generated first and second target values, wherein the controller corrects the preceding vehicle acceleration/deceleration information according to a travel scene to generate the second target value.

15 Claims, 5 Drawing Sheets

(52) U.S. Cl.
CPC ..... *B60W 2550/20* (2013.01); *B60W 2550/30* (2013.01); *B60W 2550/302* (2013.01); *B60W 2550/306* (2013.01); *B60W 2550/308* (2013.01); *B60W 2550/40* (2013.01); *B60W 2550/408* (2013.01); *B60W 2720/106* (2013.01)

(58) Field of Classification Search
CPC ....... B60W 2550/30; B60W 2550/302; B60W 2550/306; B60W 2550/308; B60W 2550/40; B60W 2550/408; B60W 2720/106
See application file for complete search history.

(56) References Cited

FOREIGN PATENT DOCUMENTS

| | | |
|---|---|---|
| JP | 2002-145029 A | 5/2002 |
| JP | 2003-327010 A | 11/2003 |
| JP | 2007-112295 A | 5/2007 |
| JP | 2008-162524 A | 7/2008 |
| JP | 2011-095834 A | 5/2011 |
| JP | 5168518 B2 | 3/2013 |
| WO | 2012/014040 A1 | 2/2012 |

VEHICLE TRAVEL CONTROL APPARATUS

TECHNICAL FIELD

The disclosure is related to a vehicle travel control apparatus.

BACKGROUND ART

It is known that acceleration/deceleration of a following vehicle is controlled by concurrently using PID control by a feedback control system based on an inter-vehicle distance difference with a preceding vehicle and control by a feed-forward system according to the acceleration/deceleration adjusting status of the preceding vehicle based on acceleration/deceleration adjusting information obtained via inter-vehicle communication (see Patent Document 1, for example). The acceleration/deceleration adjusting information is accelerator pedal operation information (accelerator position) and brake operation information (brake position). The acceleration/deceleration of the following vehicle is controlled by adding a feed-forward control amount, which corresponds to the accelerator position and the brake position of the preceding vehicle, to a feed-back control amount determined based on the inter-vehicle distance difference.

[Patent Document 1] Japanese Laid-open Patent Publication No. 11-013507

DISCLOSURE OF INVENTION

Problem to be Solved by Invention

However, according to the configuration disclosed in Patent Document 1 described above, the acceleration/deceleration adjusting information of the preceding vehicle (i.e., control amount corresponding to the accelerator position and the brake position of the preceding vehicle) is used as it is as the feed-forward control amount, a driver may have a strange feeling that something is wrong. For example, under a situation where the inter-vehicle distance is long, if the control amount of the preceding vehicle is used as it is as the feed-forward control amount, there may be a feeling that a response is too sensitive (and thus a strange feeling). Further, if the control amount of the preceding vehicle is used as it is as the feed-forward control amount in a low-speed range, the host vehicle may be caused to stop with too long of an inter-vehicle distance, which causes the driver to have a strange feeling.

Therefore, an object of the disclosure is to provide a vehicle travel control apparatus that can control acceleration/deceleration of a host vehicle such that a strange feeling for a driver is reduced.

Means to Solve the Problem

According to one aspect of the disclosure, a vehicle travel control apparatus is provided which includes:

a sensor that obtains preceding vehicle information representing a status of a preceding vehicle;

a communication apparatus that obtains preceding vehicle acceleration/deceleration information, which is generated in the preceding vehicle, via communication with the preceding vehicle; and a controller that generates a first target value related to a target acceleration/deceleration value of a host vehicle based on the preceding vehicle information and a second target value related to the target acceleration/deceleration value of the host vehicle based on the preceding vehicle acceleration/deceleration information, and controls acceleration/deceleration of the host vehicle based on the generated first and second target values, wherein the controller corrects the preceding vehicle acceleration/deceleration information according to a travel scene to generate the second target value.

Advantage of the Invention

According to the disclosure, a vehicle travel control apparatus is obtained which can control acceleration/deceleration of a host vehicle such that a strange feeling for a driver is reduced.

DESCRIPTION OF REFERENCE SYMBOLS 10 vehicle control ECU
16 forward radar sensor
18 wireless control ECU
19 wireless communication antenna
100 vehicle travel control apparatus

BEST MODE FOR CARRYING OUT THE INVENTION

In the following, embodiments are described in detail with reference to appended drawings.

Figure 1:
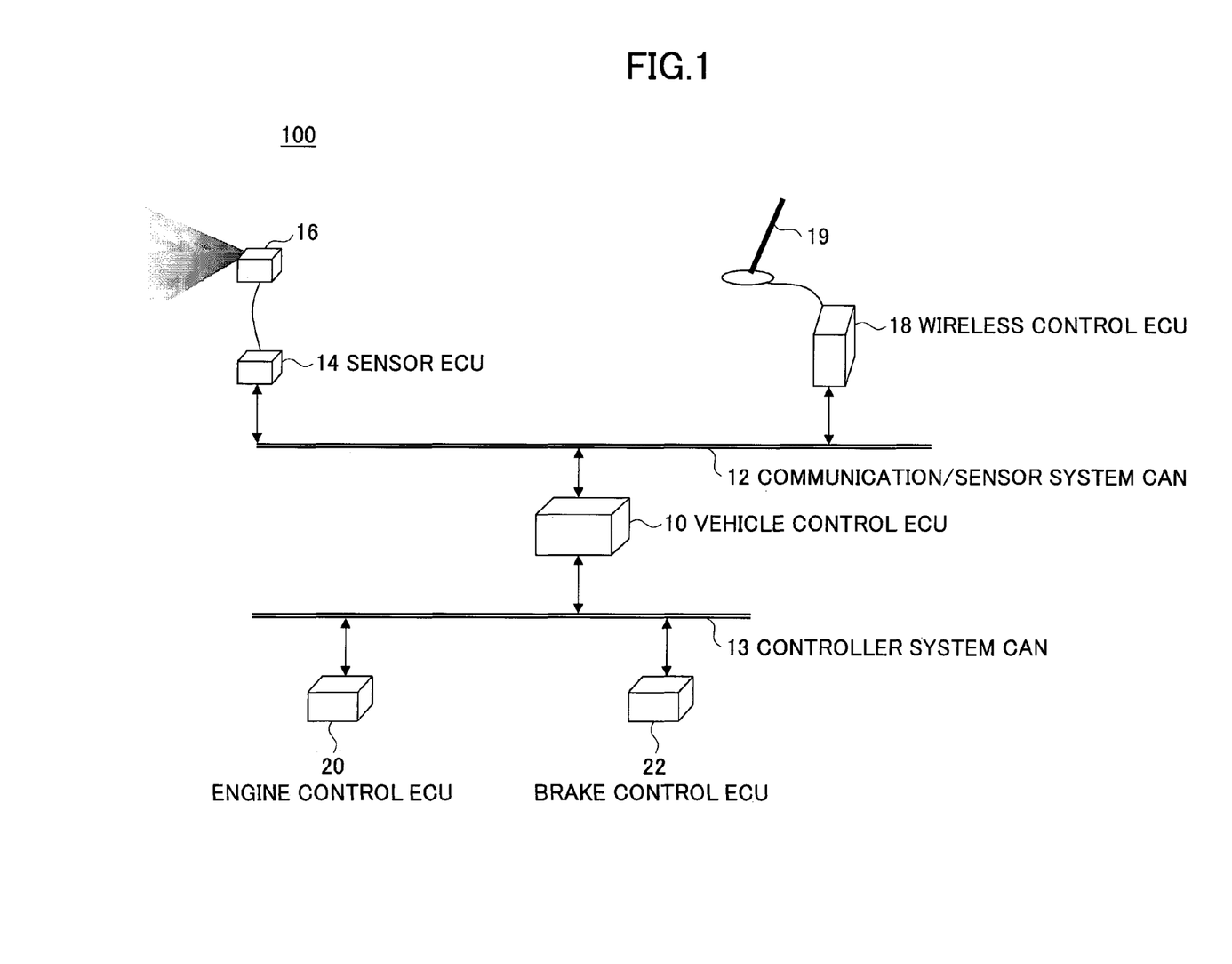
FIG. 1 is a diagram for schematically illustrating a configuration of a vehicle travel control apparatus 100 according to an embodiment.

FIG. 1 is a diagram for schematically illustrating a configuration of a vehicle travel control apparatus 100 according to an embodiment. The vehicle travel control apparatus 100 includes a vehicle control ECU (Electronic Control Unit) 10. The vehicle control ECU 10 may be formed by a processor that includes a CPU. Functions of the vehicle control ECU 10 (including functions described hereinafter) may be implemented by any hardware, any software, any firmware or any combination thereof. For example, any part of or all the functions of the vehicle control ECU 10 may be implemented by an ASIC (application-specific integrated circuit), a FPGA (Field Programmable Gate Array) or a DSP (digital signal processor). Further, the vehicle control ECU 10 may be implemented by a plurality of processors.

The vehicle control ECU 10 is connected to a sensor ECU 14 and a wireless control ECU 18 via an appropriate bus such as a communication/sensor system CAN (controller area network) 12 or the like.

The sensor ECU 14 is connected to a forward radar sensor 16. The sensor ECU 14 controls an operation of the forward radar sensor 16.

The forward radar sensor 16 detects a state (preceding vehicle information) of a preceding vehicle in front of a host vehicle using an electric wave (millimeter wave, for example), a light wave (laser, for example) or an ultrasonic wave as a detection wave. The forward radar sensor 16 detects information which represents a relationship between the preceding vehicle and the host vehicle such as a relative speed, a relative distance and a direction (a lateral position) with respect to the host vehicle, for example, at a predetermined cycle. It is noted that if the forward radar sensor 16 is a millimeter wave radar sensor, the millimeter wave radar sensor may be of an electronic controlled scanning type, for example. In this case, the relative speed of the preceding vehicle is detected using a Doppler frequency (frequency shift) of the electric wave, the relative distance of the preceding vehicle is detected using a delayed time of the reflection wave, and the direction of the preceding vehicle is detected based on a shift difference of the received waves between a plurality of reception antennas. The preceding vehicle information thus obtained is transmitted to the vehicle control ECU 10 at a predetermined cycle. It is noted that any functions of the forward radar sensor 16 (a function of calculating a position of the preceding vehicle, for example) may be implemented by the sensor ECU 14 and the vehicle control ECU 10.

An image sensor may be used in addition to or instead of the forward radar sensor 16. The image sensor includes a camera, which includes imaging elements such as CCDs (charge-coupled device), CMOSs (complementary metal oxide semiconductor), etc., and an image processor to recognize the state of the preceding vehicle. The camera of the image sensor may be of a stereo type. The image sensor detects, based on an image recognition result, the information which represents a relationship between the preceding vehicle and the host vehicle such as a relative speed, positional information of the preceding vehicle with respect to the host vehicle, for example, at a predetermined cycle. The positional information of the preceding vehicle includes information related to the position (distance) of the preceding vehicle in the back-and-forth direction of the host vehicle, and information related to the lateral position of the preceding vehicle in the lateral direction (width direction). The lateral position of the preceding vehicle may be calculated based on a center position of a pixel group related to the preceding vehicle in the lateral direction. Alternatively, the lateral position of the preceding vehicle may be calculated as a range between a left end lateral position and a right end lateral position. The preceding vehicle information thus obtained with the image sensor may be transmitted to the vehicle control ECU 10 at a predetermined cycle. It is noted that the image processing function of the image processor (a function of calculating a position of the preceding vehicle, for example) may be implemented by the vehicle control ECU 10.

The wireless control ECU 18 performs inter-vehicle communication with the preceding vehicle via a wireless communication antenna 19. The wireless control ECU 18 obtains preceding vehicle acceleration/deceleration information from the preceding vehicle via the inter-vehicle communication. The preceding vehicle acceleration/deceleration information is initially generated (obtained) in the preceding vehicle. The preceding vehicle acceleration/deceleration information may be arbitrary as long as it is related to the acceleration/deceleration of the preceding vehicle. For example, the preceding vehicle acceleration/deceleration information may be a target value for the acceleration/deceleration of the preceding vehicle, actual acceleration/deceleration value of the preceding vehicle (sensor value) or a combination thereof (filtered value). Further, the preceding vehicle acceleration/deceleration information does not necessarily have a dimension of acceleration (physical amount), and may be arbitrary information related to the acceleration/deceleration of the preceding vehicle such as a target drive force (or a target braking force), a target drive torque (or a target braking torque), positional information of the preceding vehicle, speed information of the preceding vehicle, etc. For example, the positional information of the preceding vehicle can represent the acceleration of the preceding vehicle by 2-times differentiation. In the following, as an example, it is assumed that the preceding vehicle acceleration/deceleration information is a target value of the acceleration/deceleration of the preceding vehicle (referred to as a "preceding vehicle demand G", hereinafter). The preceding vehicle acceleration/deceleration information thus obtained is transmitted to the vehicle control ECU 10 at a predetermined cycle. The preceding vehicle acceleration/deceleration information may be supplied to the vehicle control ECU 10 after it is subject to pre-processing, etc., at the wireless control ECU 18. It is noted that the function of the wireless control ECU 18 may be implemented by the vehicle control ECU 10.

It is noted that the wireless control ECU 18 may obtain information other than the preceding vehicle acceleration/deceleration information from the preceding vehicle via the inter-vehicle communication. The wireless control ECU 18 may obtain speed information of the preceding vehicle (preceding vehicle speed information) via the inter-vehicle communication. In this case, the preceding vehicle speed information may be obtained concurrently with the preceding vehicle acceleration/deceleration information or separately from the preceding vehicle acceleration/deceleration information. It is noted that, in the former case, the wireless control ECU 18 receives a signal including the preceding vehicle speed information and the preceding vehicle acceleration/deceleration information via the inter-vehicle communication.

The vehicle control ECU 10 is connected to ECUs that control acceleration/deceleration of the host vehicle, that is to say, an engine control ECU 20 and a brake control ECU 22 via an appropriate bus such as a controller system CAN 13, etc. It is noted that in the case of a hybrid vehicle and an electric vehicle, the vehicle control ECU 10 may be connected to an ECU that controls a motor (i.e., an inverter). Further, if a transmission is controlled by an ECU (transmission ECU) other than the engine control ECU 20, the transmission ECU may be connected to the vehicle control ECU 10.

During an autonomous drive switch (not illustrated) that is operated by a user being in its ON state, the vehicle control ECU 10 determines, based on the preceding vehicle information from the forward radar sensor 16, host vehicle demand acceleration (referred to as "host vehicle demand G", hereinafter) that is a target acceleration/deceleration for an autonomous drive. At that time, the vehicle control ECU 10 calculates, based on the preceding vehicle information from the forward radar sensor 16, a target acceleration/deceleration for feed-back control (referred to as "FB demand G", hereinafter), and calculates, based on the preceding vehicle acceleration/deceleration information obtained via the inter-vehicle communication, a target acceleration/deceleration for feed-forward control (referred to as "FF demand G", hereinafter). The vehicle control ECU 10 determines the host vehicle demand G based on the FB demand G and the FF demand G. It is noted that, in the following, for the sake of convenience, with respect to the host vehicle demand G, the FB demand G, the FE demand G, the preceding vehicle demand G, etc., a positive value represents "acceleration" and a negative value represents "deceleration".

The vehicle control ECU 10 outputs a control target value based on the host vehicle demand G determined such as described above to the engine control ECU 20 and the brake control ECU 22. For example, the vehicle control ECU 10 outputs a target drive force based on the demand acceleration/deceleration G to the engine control ECU 20, or outputs a target brake force based on the demand acceleration/deceleration G to the brake control ECU 22. The engine control ECU 20 and the brake control ECU 22 controls the engine and the brake apparatus such that such a control target value is implemented. For example, the engine control ECU 20 controls a fuel injection amount of the engine and/or a throttle position such that the target drive force is implemented, and controls wheel cylinder pressures of respective wheels such that the target brake force is implemented. It is noted that, in the case of the hybrid vehicle, an output of the motor, in addition to or instead of the output of the engine, may be controlled. Further, in the case of the electric vehicle, the output of the motor, instead of the output of the engine, may be controlled.

A way of calculating the FB demand G is arbitrary. For example, the calculation way used in ACC (Adaptive Cruise Control) or the like may be used. For example, the FB demand G may be determined such that an inter-vehicle time (=inter-vehicle distance/vehicle speed) between the preceding vehicle and the host vehicle becomes a predetermined target inter-vehicle time. In this case, the target inter-vehicle time may be set on a vehicle, speed basis (vehicle speed of the host vehicle). Further, the target inter-vehicle time may be varied within a predetermined range set by the user.

It is noted that, in the case of controlling the acceleration/deceleration of the host vehicle based on only the FB demand G (i.e., in the case of an ordinary ACC), the acceleration/deceleration of the host vehicle is implemented in response to an actual increase or decrease of the inter-vehicle time resulting from the acceleration/deceleration of the preceding vehicle. Thus, response of the acceleration/deceleration of the host vehicle to the acceleration/deceleration of the preceding vehicle is not relatively good. On the other hand, in the case of controlling the acceleration/deceleration of the host vehicle using the FF demand G, the acceleration/deceleration of the host vehicle is implemented in response to the generation of the acceleration/deceleration demand in the preceding vehicle. Thus, the response is relatively good. In this way, by controlling the acceleration/deceleration of the host vehicle using the FF demand G, the response of the acceleration/deceleration of the host vehicle to the acceleration/deceleration of the preceding vehicle improves.

The preceding vehicle acceleration/deceleration information (preceding vehicle demand G) is not used as it is as the FF demand G. A travel scene (situation) is considered to determine the FF demand G. The travel scene is related to the preceding vehicle, the host vehicle or a relationship between the preceding vehicle and the host vehicle. The travel scene is related to a acceleration/deceleration state of the preceding vehicle, an inter-vehicle distance or an inter-vehicle time with respect to the preceding vehicle, a vehicle speed of the host vehicle, etc., for example. In other words, the FF demand G is obtained by correcting the preceding vehicle demand G according to the travel scene. A way of calculating the FF demand G according to the travel scene is various and arbitrary. The way of calculating the FF demand G according to the travel scene may be one of various ways described hereinafter or any combination thereof, for example.

According to a first FF demand G calculation way, the FF demand G is determined such that a difference between the FF demand G and the preceding vehicle demand G becomes greater in a case where an acceleration/deceleration state of the preceding vehicle is an acceleration state (i.e., where the preceding vehicle demand G is greater than 0) than the difference in a case where the acceleration/deceleration state of the preceding vehicle is a deceleration state (i.e., where the preceding vehicle demand G is less than or equal to 0). The greater the difference is, the worse a response of the acceleration/deceleration of the host vehicle to the acceleration/deceleration of the preceding vehicle becomes. This is because the same acceleration as the preceding vehicle easily causes the driver to have a strange feeling, while the same deceleration as the preceding vehicle relaxes the driver. For example, it is assumed that the FF demand G is calculated as FF demand G=preceding vehicle demand G×K1. In this case, the coefficient K1 may be set to a value smaller than 1 (0.6, for example) in the case where the acceleration/deceleration state of the preceding vehicle is an acceleration state, while the coefficient K1 may be set to 1 in the case where the acceleration/deceleration state of the preceding vehicle is the deceleration state. With this arrangement, at the time of the acceleration event of the preceding vehicle, the host vehicle is accelerated with a delay to follow the preceding vehicle, which reduces the strange feeling, and at the time of the deceleration event of the preceding vehicle, the host vehicle is decelerated with a good response, which increases the relaxed feeling. It is noted that the coefficient K1 is not necessarily a fixed value and thus may be varied in either of the case where the acceleration/deceleration state of the preceding vehicle is the acceleration state and the case where the acceleration/deceleration state of the preceding vehicle is the deceleration state. For example, in the case where the acceleration/deceleration state of the preceding vehicle is the deceleration state, the coefficient K1 may be varied such that the coefficient K1 is closer to 1 as the magnitude of the preceding vehicle demand G increases.

It is noted that a manner in which the response of acceleration/deceleration of the host Vehicle to acceleration/deceleration of the preceding vehicle becomes worse corresponds to the manner in which the difference of the FF demand G with respect to the preceding vehicle demand G becomes greater, as described above. Thus, if the preceding vehicle starts to accelerate under a situation where the preceding vehicle and the host vehicle travel in a stable travel state (in which the acceleration is substantially 0), the host vehicle starts to accelerate with the acceleration whose magnitude is smaller than that of the preceding vehicle. Further, similarly, if the preceding vehicle starts to decelerate under a situation where the preceding vehicle and the host vehicle travel in the stable travel state (in which the acceleration is substantially 0), the host vehicle starts to decelerate with the deceleration whose magnitude (absolute value) is less than that of the preceding vehicle.

According to a second FF demand G calculation way, when the acceleration/deceleration state of the preceding vehicle is the acceleration state, the FF demand G is determined such that the difference between the FF demand G and the preceding vehicle demand G becomes greater (i.e., the response of acceleration/deceleration of the host vehicle to acceleration/deceleration of the preceding vehicle becomes worse) in a case where the inter-vehicle distance or the inter-vehicle time is a first value or a case where the inter-vehicle distance or the inter-vehicle time is a second value than the difference in a case where the inter-vehicle distance or the inter-vehicle time is a third value that is between the first and second values. This is because the same acceleration as the preceding vehicle at a short inter-vehicle distance or inter-vehicle time easily causes the driver to have a strange feeling, and also the same acceleration as the preceding vehicle at a long inter-vehicle distance or inter-vehicle time easily causes the driver to have a strange feeling. For example, it is assumed that the FF demand G is calculated as FF demand G=preceding vehicle demand G×Ktau. In this case, the coefficient Ktau may be set to a value smaller than 1 in the case where the inter-vehicle distance or the inter-vehicle time is the first value or the case where the inter-vehicle distance or the inter-vehicle time is the second value, while the coefficient Ktau may be set to 1 in the case where the inter-vehicle distance or the inter-vehicle time is the third value.

Figure 2:
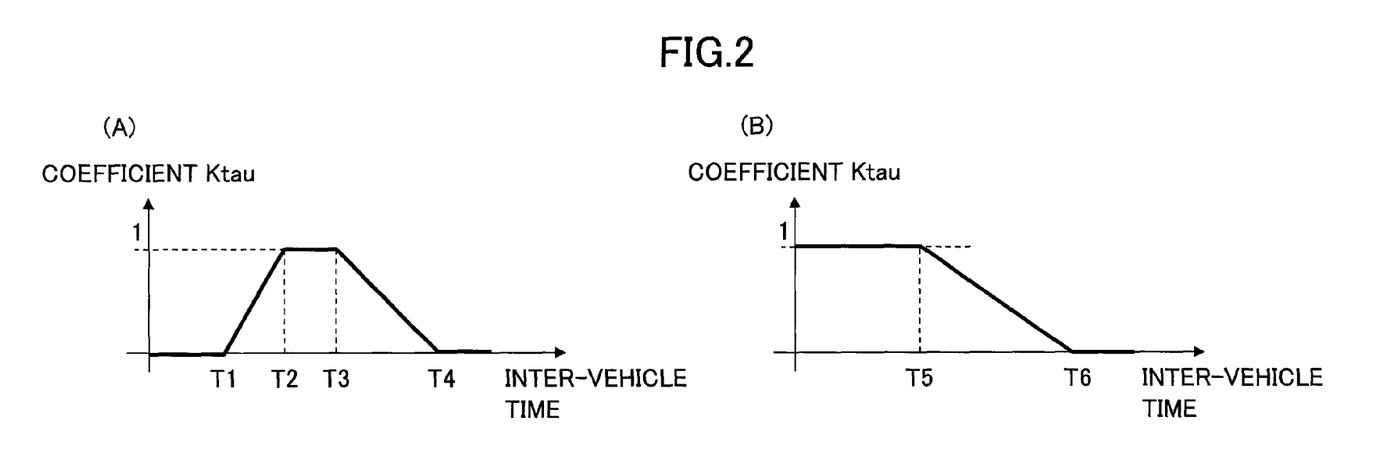
FIG. 2 is a diagram for illustrating an example of a way of determining a coefficient Ktau used for second and third FF demand G calculation ways.

FIG. 2 (A) illustrates an example of a way determining the coefficient Ktau used for the second FF demand G calculation way, and an example of a relationship between the inter-vehicle time and the coefficient Ktau. It is noted that the relationship between the inter-vehicle time and the coefficient Ktau illustrated in FIG. 2 (A) may be stored in a form of a lookup table in a predetermined storage device.

In the example illustrated in FIG. 2 (A), when the inter-vehicle distance or the inter-vehicle time is less than or equal to a predetermined time T1, the coefficient Ktau is 0. When the inter-vehicle time exceeds T1, the coefficient Ktau starts to gradually increase to be 1 when the inter-vehicle time becomes T2. The coefficient Ktau is kept at the value of 1 until the inter-vehicle time becomes T3. When the inter-vehicle time exceeds T3, the coefficient Ktau starts to gradually decrease. When the inter-vehicle time becomes greater than or equal to T4, the coefficient Ktau becomes 0. With this arrangement, when the inter-vehicle time is relatively short such that it is between T2 and T3, such acceleration/deceleration of the host vehicle whose response to the acceleration/deceleration of the preceding vehicle is very good can be implemented. Further, when the inter-vehicle time is very short such that it is shorter than T1, such a specification that dares to reduce the response can be implemented considering the safety.

It is noted that the example illustrated in FIG. 2 (A) is just an example, and various changes may be made. For example, a section in which the correction coefficient Ktau is 0 may include a section in which the correction coefficient Ktau is slightly greater than 0. Similarly, a section in which the correction coefficient Ktau is 1 may include a section in which the correction coefficient Ktau is slightly less than 1. Further, in the example illustrated in FIG. 2 (A), the correction coefficient Ktau increases linearly when the inter-vehicle time exceeds T1; however, the correction coefficient Ktau may increase non-linearly. Similarly, in the example illustrated in FIG. 2 (A), the correction coefficient Ktau decreases linearly when the inter-vehicle time exceeds T3; however, the correction coefficient Ktau may decrease non-linearly.

According to a third FF demand G calculation way, when the acceleration/deceleration state of the preceding vehicle is the deceleration state, the FF demand G is determined such that the difference between the FF demand G and the preceding vehicle demand G becomes greater (i.e., the response of acceleration/deceleration of the host vehicle to acceleration/deceleration of the preceding vehicle becomes worse) in a case where the inter-vehicle distance or the inter-vehicle time is a fourth value than the difference in a case where the inter-vehicle distance or the inter-vehicle time is a fifth value (smaller than the fourth value). This is because the same deceleration as the preceding vehicle at a long inter-vehicle distance or inter-vehicle time easily causes the driver to have a strange feeling, while the same deceleration as the preceding vehicle at a short inter-vehicle distance or inter-vehicle time relaxes the driver. For example, it is assumed that the FF demand G is calculated as FF demand G=preceding vehicle demand G×Ktau. In this case, the coefficient Ktau may be set to a value smaller than 1 in the case where the inter-vehicle distance or the inter-vehicle time is the fourth value, while the coefficient Ktau may be set to 1 in the case where the inter-vehicle distance or the inter-vehicle time is the fifth value.

FIG. 2 (B) illustrates an example of a way of determining the coefficient Ktau used for the third FF demand G calculation way, and an example of a relationship between the inter-vehicle time and the coefficient Ktau. It is noted that the relationship between the inter-vehicle time and the coefficient Ktau illustrated in FIG. 2 (B) may be stored in a form of a lookup table in a predetermined storage device.

In the example illustrated in FIG. 2 (B), when the inter-vehicle distance or the inter-vehicle time is less than or equal to a predetermined time T5, the coefficient Ktau is 1. When the inter-vehicle time exceeds T5, the coefficient Ktau starts to gradually decrease. When the inter-vehicle time becomes greater than or equal to T6, the coefficient Ktau becomes 0.

It is noted that the example illustrated in FIG. 2 (B) is just an example, and various changes may be made. For example, a section in which the correction coefficient Ktau is 0 may include a section in which the correction coefficient Ktau is slightly greater than 0. Similarly, a section in which the correction coefficient Ktau is 1 may include a section in which the correction coefficient Ktau is slightly smaller than 1. Further, in the example illustrated in FIG. 2 (B), the correction coefficient Ktau decreases linearly when the inter-vehicle time exceeds T5; however, the correction coefficient Ktau may decrease non-linearly.

According to a fourth FF demand G calculation way, when the acceleration/deceleration state of the preceding vehicle is the acceleration state, the FF demand G is determined such that the difference between the FF demand G and the preceding vehicle demand G becomes greater (i.e., the response of acceleration/deceleration of the host vehicle to acceleration/deceleration of the preceding vehicle becomes worse) in a case where the vehicle speed of the host vehicle is within a high-speed range than the difference in a case where the vehicle speed of the host vehicle is within a middle-speed range or a low-speed range. With this arrangement, in the high-speed range the response is reduced to implement the acceleration/deceleration with the FB demand G, which can reduce the strange feeling of the driver. For example, it is assumed that the FF demand G is calculated as FF demand G=preceding vehicle demand G×Kv. In this case, the coefficient Kv may be set to a value less than 1 in the case where the vehicle speed of the host vehicle is within the high-speed range, while the coefficient Kv may be set to 1 in the case where the vehicle speed of the host vehicle is within the middle-speed range or the low-speed range. However, a high response is not necessary at the time of starting to travel, and thus the coefficient Kv may be set to a very small value when the vehicle speed of the host vehicle is within a very low-speed range.

Figure 3:
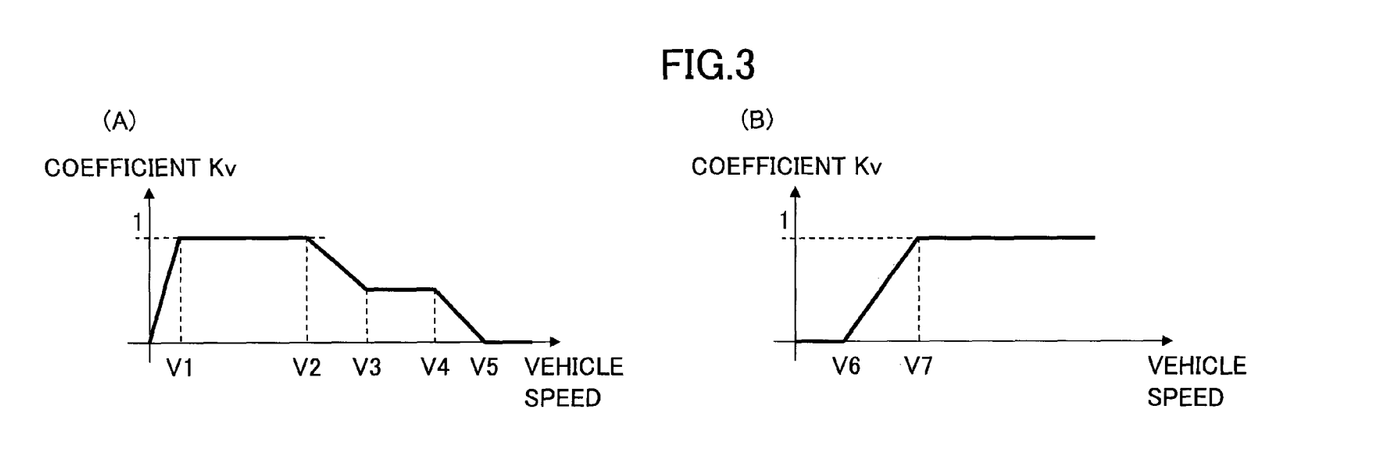
FIG. 3 is a diagram for illustrating an example of a way of determining a coefficient Kv used for a calculation of fourth and fifth FF demands G.

FIG. 3 (A) illustrates an example of a way of determining the coefficient Kv used for the fourth FF demand G calculation way, and an example of a relationship between the vehicle speed of the host vehicle and the coefficient Kv. It is noted that the relationship between the vehicle speed of the host vehicle and the coefficient Kv illustrated in FIG. 3 (A) may be stored in a form of a lookup table in a predetermined storage device.

In the example illustrated in FIG. 3 (A), the coefficient Kv is 0 when the vehicle speed of the host vehicle is 0. The coefficient Kv increases to 1 when the vehicle speed of the host vehicle becomes 1. V1 may be relatively small. The coefficient Kv is kept at 1 when the vehicle speed of the host vehicle is between V1 and V2. The coefficient Kv gradually decreases when the vehicle speed of the host vehicle exceeds V2. The coefficient Kv becomes 0.5 when the vehicle speed of the host vehicle becomes V3. The coefficient Kv is kept at 0.5 when the vehicle speed of the host vehicle is between V3 and V4. The coefficient Kv gradually decreases when the vehicle speed of the host vehicle exceeds V4. The coefficient Kv becomes 0 when the vehicle speed of the host vehicle becomes greater than or equal to V5.

It is noted that the example illustrated in FIG. 3 (A) is just an example, and various changes may be made. For example, a section in which the correction coefficient Kv is 0 may include a section in which the correction coefficient Kv is slightly greater than 0. Similarly, a section in which the correction coefficient Kv is 1 may include a section in which the correction coefficient Kv is slightly less than 1. Further, in the example illustrated in FIG. 3 (A), the correction coefficient Kv increases gradually from 0 to 1 as the vehicle speed of the host vehicle increases from 0 to V1; however, the correction coefficient Kv may increase non-linearly. Further, the correction coefficient Kv may be kept at 1 when the vehicle speed of the host vehicle is between V1 and V4. Alternatively, the correction coefficient Kv may be decreased to 0 when the vehicle speed of the host vehicle becomes V3.

According to a fifth FF demand G calculation way, when the acceleration/deceleration state of the preceding vehicle is the deceleration state, the FF demand G is determined such that the difference between the FF demand G and the preceding vehicle demand G becomes greater (i.e., the response of acceleration/deceleration of the host vehicle to acceleration/deceleration of the preceding vehicle becomes worse) in a case where the vehicle speed of the host vehicle is a first vehicle speed than the difference in a case where the vehicle speed of the host vehicle is a second vehicle speed (higher than the first vehicle speed). For example, it is assumed that the FF demand G is calculated as FF demand G=preceding vehicle demand G×Kv. In this case, the coefficient Kv may be set to a value less than 1 in the case where the vehicle speed of the host vehicle is within the low-speed range, while the coefficient Kv may be set to 1 in the case where the vehicle speed of the host vehicle is within the middle-speed range or the high-speed range. With this arrangement, in the low-speed range the response is reduced to implement the stoppage with the FB demand G, which can reduce the strange feeling of the driver.

FIG. 3 (B) illustrates example of a way of determining the coefficient Kv used for the fifth FF demand G calculation way, and an example of a relationship between the vehicle speed of the host vehicle and the coefficient Kv. It is noted that the relationship between the vehicle speed of the host vehicle and the coefficient Kv illustrated in FIG. 3 (B) may be stored in a form of a lookup table in a predetermined storage device.

In the example illustrated in FIG. 3 (B), the coefficient Kv is 0 when the vehicle speed of the host vehicle is 0. The coefficient Kv increases gradually when the vehicle speed of the host vehicle becomes V6. The coefficient Kv is kept at 1 when the vehicle speed of the host vehicle becomes greater than or equal to V7. V7 may be greater than V1 illustrated in FIG. 3 (A).

It is noted that the example illustrated in FIG. 3 (B) is just an example, and various changes may be made. For example, a section in which the correction coefficient Kv is 0 may include a section in which the correction coefficient Kv is slightly greater than 0. Similarly, a section in which the correction coefficient Kv is 1 may include a section in which the correction coefficient Kv is slightly less than 1. Further, in the example illustrated in FIG. 3 (B), the correction coefficient Kv increases gradually from 0 to 1 as the vehicle speed of the host vehicle increases from V6 to V7; however, the correction coefficient Kv may increase non-linearly.

Figure 4:
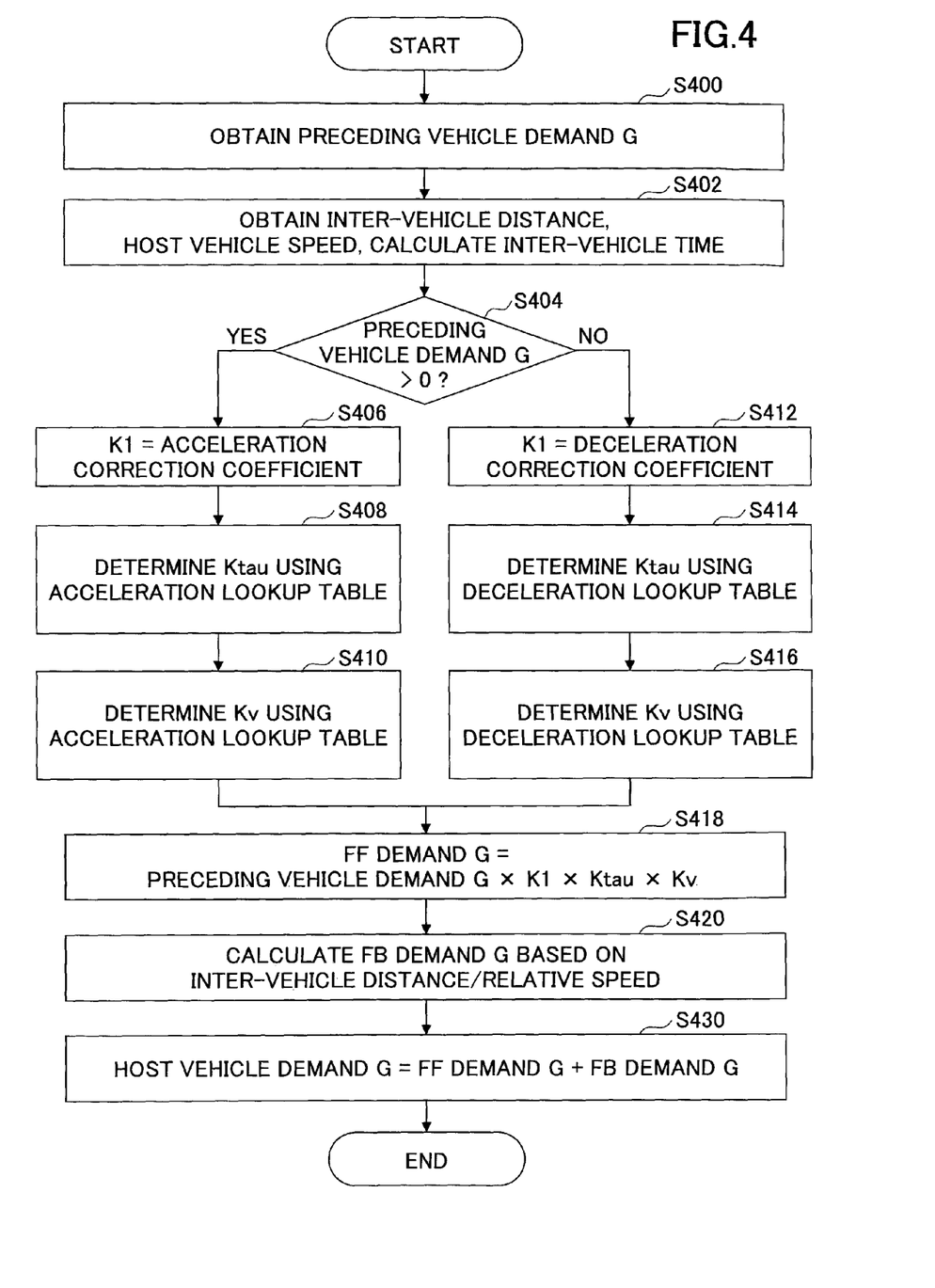
FIG. 4 is an example of a flowchart of a process that may be executed by a vehicle control ECU 10.

FIG. 4 is an example of a flowchart of a process that may be executed by a vehicle control ECU 10. The process routine illustrated in FIG. 4 may be performed repeatedly every predetermined cycle during the ON state of the autonomous drive switch.

In step S400, the vehicle control ECU 10 obtains the latest preceding vehicle acceleration/deceleration information (preceding vehicle demand G) from the wireless control ECU 18. It is noted that the cycle of the inter-vehicle communication in the wireless control ECU 18 may be arbitrary, but preferably it is as short as the case with the predetermined cycle of the process routine illustrated in FIG. 4.

In step S402, the vehicle control ECU 10 obtains the latest information related to the inter-vehicle distance with respect to the preceding vehicle and the vehicle speed of the host vehicle, and calculates the inter-vehicle time. The information related to the inter-vehicle distance may be included in the preceding vehicle information from the forward radar sensor 16, or may be included in the preceding vehicle preceding vehicle demand G information (in this case, the inter-vehicle distance measured in the preceding vehicle). The information of the vehicle speed may be obtained from the brake control ECU 22, for example. The information of the vehicle speed may be based on detection values of vehicle speed sensors. However, the information of the vehicle speed may be calculated based on the positions of the host vehicle measured by a GPS (Global Positioning System) receiver, or may be calculated based on detection values of rpms of an output shaft of the transmission. The inter-vehicle time may be calculated by dividing the inter-vehicle distance by the vehicle speed of the host vehicle.

In step S404, the vehicle control ECU 10 determines whether the preceding vehicle demand G obtained in step S400 is greater than 0, that is to say, the preceding vehicle is in the acceleration state. It the preceding vehicle demand G is greater than 0, the process routine goes to step S406, and otherwise (i.e., the preceding vehicle is in the deceleration state or the stable travel state), the process routine goes to step S412.

In step S406, the vehicle control ECU 10 sets the coefficient K1 as an acceleration correction coefficient. The acceleration correction coefficient is less than a deceleration correction coefficient described hereinafter.

In step S408, the vehicle control ECU 10 determines the coefficient Ktau according to the current inter-vehicle time calculated in step S402 using an acceleration lookup table (a lookup table that defines the relationship illustrated in FIG. 2 (A), for example).

In step S410, the vehicle control ECU 10 determines the coefficient Kv according to the current vehicle speed of the host vehicle using an acceleration lookup table (a lookup table that defines the relationship illustrated in FIG. 3 (A), for example).

In step S412, the vehicle control ECU 10 sets the coefficient K1 as a deceleration correction coefficient. The deceleration correction coefficient may be 1, for example.

In step S414, the vehicle control ECU 10 determines the coefficient Ktau according to the current inter-vehicle time calculated in step S402 using a deceleration lookup table (a lookup table that defines the relationship illustrated in FIG. 2 (B), for example).

In step S416, the vehicle control ECU 10 determines the coefficient Kv according to the current vehicle speed of the host vehicle using a deceleration lookup table (a lookup table that defines the relationship illustrated in FIG. 3 (B), for example).

In step S418, the vehicle control ECU 10 calculates the FF demand G based on the preceding vehicle demand G obtained in step S400, and the coefficients K1, Ktau and Kv determined in steps S406, S408 and S410 or S412, S414 and S416, using the following formula, for example.

$$FF\ \text{demand}\ G = \text{preceding vehicle demand}\ G \times K1 \times Ktau \times Kv$$

In other words, the FF demand G is calculated by multiplying the preceding vehicle demand G by the coefficients K1, Ktau and Kv.

In step S420, the vehicle control ECU 10 calculates the FB demand G based on the information related to the inter-vehicle distance, etc., with respect to the preceding vehicle. As described above, the information related to the inter-vehicle distance may be included in the preceding vehicle information from the forward radar sensor 16, or may be included in the preceding vehicle preceding vehicle demand G information (in this case, the inter-vehicle distance, etc., measured in the preceding vehicle).

In step S430, the vehicle control ECU 10 calculates the host vehicle demand G based on the FF demand G calculated in step S418 and the FB demand G calculated in step S420 At that time, the host vehicle demand G may be calculated using the following formula, for example.

$$\text{Host vehicle demand}\ G = FF\ \text{demand}\ G + FB\ \text{demand}\ G$$

In other words, the host vehicle demand G is calculated by summing the FF demand G and the FB demand G. When the host vehicle demand G is thus calculated, the acceleration/deceleration of the host vehicle is controlled such that the host vehicle demand G is implemented. When the process of step S430 is terminated, the process routine starts from the process of step S400 at the next process cycle.

According to the process illustrated in FIG. 4, the FF demand G is calculated by multiplying the preceding vehicle demand G by the coefficients K1, Ktau and Kv according to the travel scene, which enables the acceleration/deceleration control with a high response and without causing the strange feeling according to the travel scene, in comparison with a comparative configuration in which the preceding vehicle demand G is used as it is as the FF demand G.

It is noted that, according to the process illustrated in FIG. 4, three coefficients K1, Ktau and Kv are used; however, any one or any combination thereof may be use. Further, other coefficient(s) according to other parameter(s) related to the travel scene may be added. Alternatively, other coefficient(s) not related to the travel scene may be added. For example, the FF demand G may be calculated by the following formula, for example, by adding Kuser for considering a preference of a user.

$$FF\ \text{demand}\ G = \text{preceding vehicle demand}\ G \times K1 \times Ktau \times Kv \times Kuser$$

Kuser may be determined based on autonomous drive setting information (setting information for a target inter-vehicle time, for example) that may be set by the user. In this case, the coefficient Kuser may be greater in a case where the target inter-vehicle time set by the user is shorter than that in a case where the target inter-vehicle time set by the user is relatively long. This is because the user who set the short target inter-vehicle time tends to prefer a high response.

Further, according to the process illustrated in FIG. 4, three coefficients K1, Ktau and Kv are calculated independently; however, the coefficient K1 may be included in the coefficient Ktau or Kv, for example. In other words, the coefficient Ktau or Kv may be calculated such that the coefficient K1 affects the coefficient Ktau or Kv. Similarly, instead of calculating Ktau or Kv, independently, a two-dimensional lookup table, in which a relationship between the coefficient, the vehicle speed, and the inter-vehicle time is defined, may be used to determine the coefficient.

Figure 5:
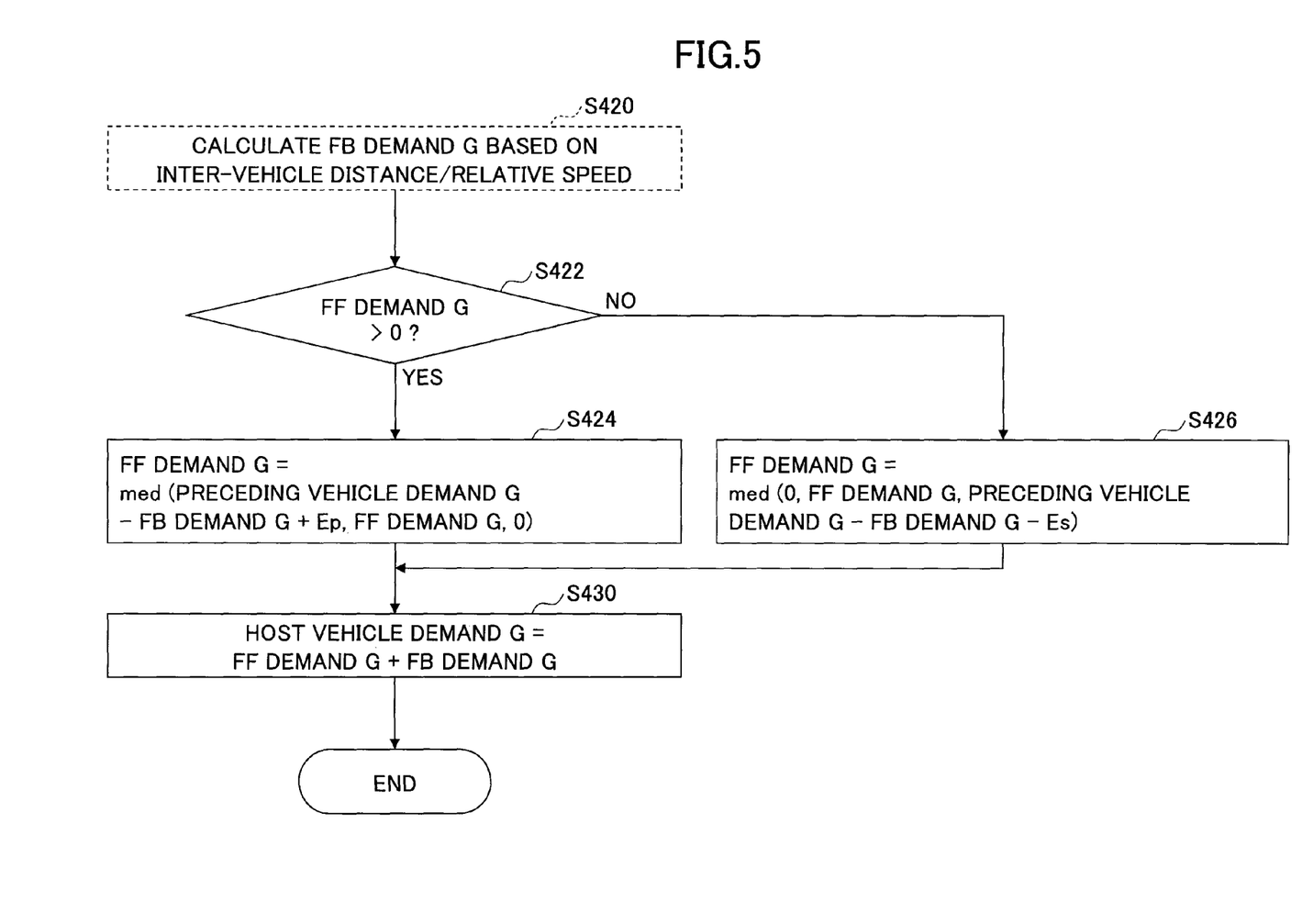
FIG. 5 is a flowchart for illustrating a variant of the process illustrated in FIG. 4.

FIG. 5 is a flowchart for illustrating a variant of the process illustrated in FIG. 4. The process after step S420 in FIG. 4 may be replaced with processes in step S422, S424 and S426 illustrated in FIG. 5.

In step S422, the vehicle control ECU 10 determines whether the FF demand G calculated in step S418 is greater than 0, that is to say, the FF demand G represents the acceleration. It the FF demand G is greater than 0, the process routine goes to step S424, and otherwise (i.e., the FF demand G represents the deceleration or the stable travel), the process routine goes to step S426.

In step S424, the vehicle control ECU 10 corrects the FF demand G by the following formula.

$$FF\ \text{demand}\ G = \text{med}\ (G1,\ FF\ \text{demand}\ G,\ 0)$$

"med" means a median value among parenthesized three values. G1 is as follows.

$$G1 = \text{preceding vehicle demand}\ G - FB\ \text{demand}\ G + Ep$$

Ep is a margin and may be a fixed value. Alternatively, Ep may be a variable that is set according to the magnitude of the preceding vehicle demand G or the FF demand G. Further, Ep may be 0.

In step S426, the vehicle control ECU 10 corrects the FF demand G by the following formula.

$$FF\ \text{demand}\ G = \text{med}(0,\ FF\ \text{demand}\ G,\ G2)$$

G2 is as follows.

$$G2 = \text{preceding vehicle demand}\ G - FB\ \text{demand}\ G - Es$$

Es is a margin and may be a fixed value. Alternatively, Es may be a variable that is set according to the magnitude of the preceding vehicle demand G or the FF demand G. Further, Es may be 0.

In step S430, the vehicle control ECU 10 calculates the host vehicle demand G based on the FF demand G calculated in step S424 or S426 and the FB demand G calculated in step S420 At that time, the host vehicle demand G may be calculated using the following formula, for example.

$$\text{Host vehicle demand}\ G = FF\ \text{demand}\ G + FB\ \text{demand}\ G$$

In other words, the host vehicle demand G is calculated by summing the FF demand G and the FB demand G. When the host vehicle demand G is thus calculated, the acceleration/deceleration of the host vehicle is controlled such that the host vehicle demand G is implemented.

According to the process illustrated in FIG. 5, the following effects can be obtained in addition to the effects obtained by the process illustrated in FIG. 4. As described above, the FF demand G is subject to the correction in step S424 or step S426, which enables smooth control at the time of the acceleration/deceleration of the preceding vehicle.

Specifically, in step S424, as described above, the FF demand G is greater than 0. Thus, in the case where a relationship "preceding vehicle demand G−FB demand G+Ep>FF demand G" is met, a relationship "FF demand G=FF demand G" holds true (i.e., the FF demand G is used as it is without the correction). On the other hand, when a relationship "FF demand G>preceding vehicle demand G−FB demand G+Ep" is met, "FF demand G=FF demand G−FB demand G+Ep" holds true (i.e., the FF demand G is corrected to be "preceding vehicle demand G−FB demand G+Ep") if a relationship "preceding vehicle demand G−FB demand G+Ep>0" is met. As described above, in step S430, the host vehicle demand G is obtained by summing the FF demand G and the FB demand G. Thus, if the FF demand G is not corrected when a relationship "FF demand G>preceding vehicle demand G−FB demand G+Ep" is met, a relationship "host vehicle demand G>preceding vehicle demand G+Ep" holds true, and thus at the time of the acceleration the host vehicle demand G may be substantially greater than the preceding vehicle demand G (by more than the margin Ep) due to the FF demand G. In contrast, if the FF demand G is corrected in step S424 such as "FF demand G=preceding vehicle demand G−FB demand G+Ep", a relationship "host vehicle demand G=preceding vehicle demand G+Ep" holds true. Thus, at the time of the acceleration it is prevented that the host vehicle demand G may be substantially greater than the preceding vehicle demand G due to the FF demand G.

Further, in step S424, when the relationship "FF demand G>preceding vehicle demand G−FB demand G+Ep" is met, FF demand G is equal to 0 (i.e., the FF demand G is corrected to be 0) if a relationship "preceding vehicle demand G−FB demand G+Ep≤0" is met. Thus, in this case, In subsequent step S430, the host vehicle demand G is equal to the FB demand G, which means that the acceleration due to the FB demand G is permitted. Therefore, depending on the magnitude of the FB demand G, such acceleration that causes the host vehicle demand G to be substantially greater than the preceding vehicle demand G (by more than the margin Ep), for example, may be permitted.

Similarly, in step S426, as described above, the FF demand G is less than or equal to 0. Thus, in the case where a relationship "preceding vehicle demand G−FB demand G−Es≤FF demand G" is met, a relationship "FF demand G=FF demand G" holds true (i.e., the FF demand G is used as it is without the correction). On the other hand, when a relationship "FF demand G<preceding vehicle demand G−FB demand G−Es" is met, "FF demand G=FF demand G−FB demand G−Es" holds true (i.e., the FF demand G is corrected to be "preceding vehicle demand G−FB demand G−Es") if a relationship "preceding vehicle demand G−FB demand G−Es<0" is met. As described above, in step S430, the host vehicle demand G is obtained by summing the FF demand G and the FB demand G. Thus, if the FF demand G is not corrected when a relationship "FF demand G<preceding vehicle demand G−FB demand G−Es" is met, a relationship "host vehicle demand G<preceding vehicle demand G−Es" holds true, and thus at the time of the deceleration the magnitude (absolute value) of the host vehicle demand G may be substantially greater than the magnitude of the preceding vehicle demand G (by more than the margin Es) due to the FF demand G. In contrast, if the FF demand G is corrected in step S426 such as "FF demand G=preceding vehicle demand G−FB demand G−Es", a relationship "host vehicle demand G=preceding vehicle demand G−Es" holds true. Thus, at the time of the deceleration it is prevented that the magnitude of the host vehicle demand G may be substantially greater than the magnitude of the preceding vehicle demand G due to the FF demand G.

Further, in step S426, when the relationship "FF, demand G<preceding vehicle demand G−FB demand G−Es" is met, FF demand G is equal to 0 (i.e., the FF demand G is corrected to be 0) if a relationship "preceding vehicle demand G−FB demand G−Es≥0" is met. Thus, in this case, In subsequent step S430, the host vehicle demand G is equal to the FB demand G, which means that the deceleration due to the FB demand G is permitted. Therefore, depending on the magnitude of the FB demand G, such deceleration that causes the host vehicle demand G to be substantially greater than the preceding vehicle demand G (by more than the margin Es), for example, may be permitted.

Figure 6:
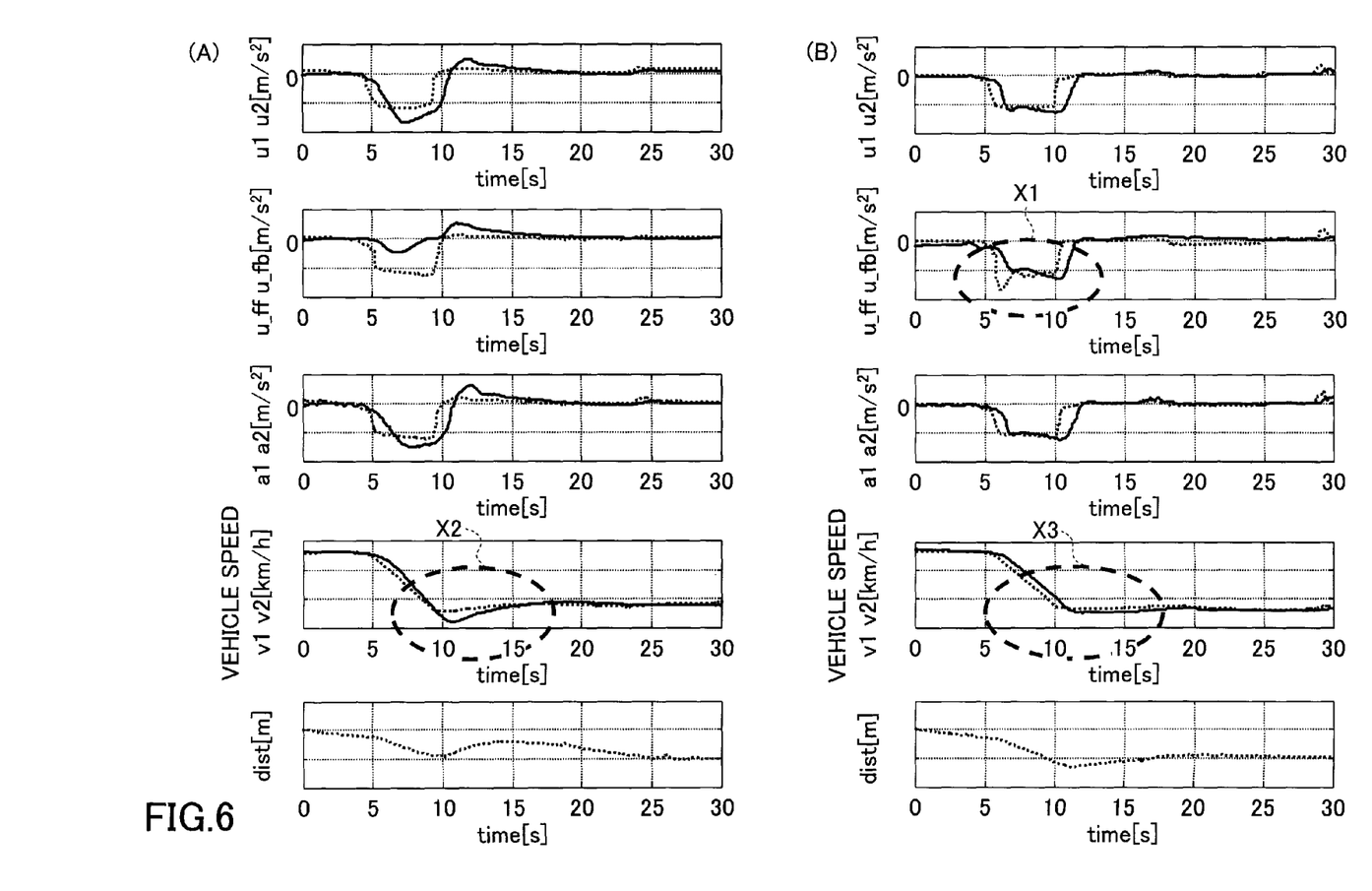
FIG. 6 is a graph obtained in confirming effects of the process in FIG. 5 with a simulation.

FIG. 6 is a graph obtained in confirming effects of the process in FIG. 5 with a simulation. In FIG. 6, (A) illustrates a case of a configuration in which the correction of the FF demand G is not performed (see FIG. 4), and (B) illustrates a case of a configuration in which the correction of the FF demand G is performed (see FIG. 5). In FIGS. 6 (A) and (B), wave shapes of predetermined parameters of two vehicle (i.e., the preceding vehicle and the host vehicle) in time series are illustrated in corresponding graphs. The graphs illustrate the wave shapes of the demand acceleration u1 and u2 of the preceding vehicle and the host vehicle, the wave shapes of the FF demand G (u_ff) and the FB demand G (u_fb) of the host vehicle, the wave shapes of the actual acceleration a1 and a2 of the preceding vehicle and the host vehicle, the wave shapes of the vehicle speed v1 and v2 of the preceding vehicle and the host vehicle, and the wave shapes of the inter-vehicle distance (dist) between the preceding vehicle and the host vehicle, in this order from the upper side.

According to the simulation illustrated in FIG. 6, the preceding vehicle starts to decelerate around time t=5. In other words, the preceding vehicle demand G is suddenly changed to the negative value. Correspondingly, according to the configuration in which the correction of the FF demand G is not performed (see FIG. 4), as illustrated in FIG. 6 (A), the FF demand G changes in response to the change in the preceding vehicle demand G. In contrast, according to the configuration in which the correction of the FF demand G is performed (see. FIG. 5), as indicated by "X1" in FIG. 6 (B), the FF demand G is corrected (suppressed). As a result of this, according to the configuration in which the correction of the FF demand G is performed (see FIG. 5), as indicated by "X2" and "X3" in FIGS. 6 (A) and (B), the reduction in the vehicle speed can be reduced with respect to the configuration in which the correction of the FF demand G is not performed (see FIG. 4).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiment described above, the FF demand G is calculated by multiplying the preceding vehicle demand G by the coefficients K1, Ktau and Kv; however, the FF demand G is calculated by adding or subtracting correction amounts to or from the preceding vehicle demand G. Also in this case, the same idea, as is the case with the coefficients K1, Ktau and Kv, may be used to set the correction amounts. Further, in the embodiment described above, as an example, the FF demand G is calculated by directly correcting the preceding vehicle demand G; however, the FF demand G may be calculated by indirectly correcting the preceding vehicle demand G. For example, the FF demand G may be obtained by calculating a control value (intermediate value) for the feed-forward control from the preceding vehicle demand G, and correcting the control value. In any cases, as a result, it can be said that the preceding vehicle information is corrected to obtain the FF demand G.

Further, in the embodiment described above, as an example, the case is assumed where the preceding vehicle acceleration/deceleration information is the preceding vehicle demand G; however, the preceding vehicle acceleration/deceleration information may be any information related to the acceleration/deceleration of the preceding vehicle, as described above. For example, the preceding vehicle acceleration/deceleration information may be the throttle position and the brake position of the preceding vehicle. In this case, in the host vehicle, the preceding vehicle demand G may be calculated (estimated) from the throttle position and the brake position, and the calculated preceding vehicle demand G may be used similarly. Alternatively, the throttle position and the brake position may be corrected according to the travel scene and then converted to the preceding vehicle demand G. In this case, the obtained preceding vehicle demand G may be used as it is as the FF demand G (However, the obtained preceding vehicle demand G may be subject to the correction process illustrated in FIG. 5). Further, the preceding vehicle acceleration/deceleration information may be a combination (filtered value) of the preceding vehicle demand G and the actual acceleration/deceleration of the preceding vehicle, as described above. In this case, the combining process may be performed in the host vehicle (by the vehicle control ECU 10, for example).

The present application is based on Japanese Priority Application No. 2013-185684, filed on Sep. 6, 2013, the entire contents of which are hereby incorporated by reference.

The invention claimed is:

1. A vehicle travel control apparatus, comprising:
a sensor that obtains preceding vehicle information representing a status of a preceding vehicle;
a communication apparatus that obtains preceding vehicle acceleration/deceleration information, which is generated in the preceding vehicle, via communication with the preceding vehicle; and
a controller programmed to:
generate a first target value related to a target acceleration/deceleration value of a host vehicle based on the preceding vehicle information and a second target value related to the target acceleration/deceleration value of the host vehicle based on the preceding vehicle acceleration/deceleration information, control acceleration/deceleration of the host vehicle based on the generated first and second target values, and
correct the preceding vehicle acceleration/deceleration information according to a travel scene to generate the second target value.

2. The vehicle travel control apparatus of claim 1, wherein the controller corrects the preceding vehicle acceleration/deceleration information based on at least one of a acceleration/deceleration state of the preceding vehicle, an inter-vehicle distance or an inter-vehicle time with respect to the preceding vehicle, and a vehicle speed of the host vehicle.

3. The vehicle travel control apparatus of claim 2, wherein the controller corrects the preceding vehicle acceleration/deceleration information based on the acceleration/deceleration state of the preceding vehicle in such a manner that a response of acceleration/deceleration of the host vehicle to acceleration/deceleration of the preceding vehicle becomes worse in a case where the acceleration/deceleration state of the preceding vehicle is an acceleration state than the response in a case where the acceleration/deceleration state of the preceding vehicle is a deceleration state.

4. The vehicle travel control apparatus of claim 3, wherein the preceding vehicle acceleration/deceleration information includes target acceleration/deceleration of the preceding vehicle,
the second target value is generated by multiplying the target acceleration/deceleration of the preceding vehicle by a predetermined coefficient, and
correcting the preceding vehicle acceleration/deceleration information in such a manner that the response of acceleration/deceleration of the host vehicle to acceleration/deceleration of the preceding vehicle becomes worse includes making a value of the predetermined coefficient smaller.

5. The vehicle travel control apparatus of claim 3, wherein the manner in which the response of acceleration/deceleration of the host vehicle to acceleration/deceleration of the preceding vehicle becomes worse corresponds to a manner in which the host vehicle starts to accelerate with the acceleration whose magnitude is less than that of the preceding vehicle when the preceding vehicle accelerates under a situation where the preceding vehicle and the host vehicle travel in a stable travel state, and a manner in which the host vehicle starts to decelerate with the deceleration whose magnitude is less than that of the preceding vehicle when the preceding vehicle decelerates under the situation where the preceding vehicle and the host vehicle travel in a stable travel state.

6. The vehicle travel control apparatus of claim 2, wherein the controller corrects the preceding vehicle acceleration/deceleration information based on the acceleration/deceleration state of the preceding vehicle and the inter-vehicle distance or the inter-vehicle time with respect to the preceding vehicle in such a manner that, when the acceleration/deceleration state of the preceding vehicle is an acceleration state, a response of acceleration/deceleration of the host vehicle to acceleration/deceleration of the preceding vehicle becomes worse in a case where the inter-vehicle distance or the inter-vehicle time is first or second value than the response in a case where the inter-vehicle distance or the inter-vehicle time is a third value that is between the first and second values.

7. The vehicle travel control apparatus of claim 2, wherein the controller corrects the preceding vehicle acceleration/deceleration information based on the acceleration/deceleration state of the preceding vehicle and the inter-vehicle distance or the inter-vehicle time with respect to the preceding vehicle in such a manner that, when the acceleration/deceleration state of the preceding vehicle is a deceleration state, a response of acceleration/deceleration of the host vehicle to acceleration/deceleration of the preceding vehicle becomes worse in a case where the inter-vehicle distance or the inter-vehicle time is a fourth value than the response in a case where the inter-vehicle distance or the inter-vehicle time is a fifth value that is smaller than the fourth value.

8. The vehicle travel control apparatus of claim 2, wherein the controller corrects the preceding vehicle acceleration/deceleration information based on the acceleration/deceleration state of the preceding vehicle and the vehicle speed of the host vehicle in such a manner that, when the acceleration/deceleration state of the preceding vehicle is a deceleration state, a response of acceleration/deceleration of the host vehicle to acceleration/deceleration of the preceding vehicle becomes worse in a case where the vehicle speed of the host vehicle is a first vehicle speed than the response in a case where the vehicle speed of the host vehicle is a second vehicle speed that is higher than the first vehicle speed.

9. The vehicle travel control apparatus of claim 2, wherein the controller corrects the preceding vehicle acceleration/deceleration information based on the acceleration/deceleration state of the preceding vehicle and the vehicle speed of the host vehicle in such a manner that, when the acceleration/deceleration state of the preceding vehicle is an acceleration state, a response of acceleration/deceleration of the host vehicle to acceleration/deceleration of the preceding vehicle becomes worse in a case where the vehicle speed of the host vehicle is within a high-speed range that is higher than a predetermined vehicle speed than the response in a case where the vehicle speed of the host vehicle is lower than the high-speed range.

10. The vehicle travel control apparatus of claim 1, wherein the preceding vehicle acceleration/deceleration information includes target acceleration/deceleration of the preceding vehicle,
the controller controls the acceleration/deceleration of the host vehicle based on a third target value that corresponds to a sum of the first target value and the second target value, and
the controller corrects the second target value in such a manner that magnitude of the acceleration/deceleration corresponding to the third target value does not exceed magnitude of target acceleration/deceleration of the preceding vehicle by a predetermined value.

11. The vehicle travel control apparatus of claim 10, wherein, when the acceleration/deceleration state of the preceding vehicle is an acceleration state, the controller corrects the second target value to a median value among three values, the three values including 0; a value obtained by adding the predetermined value to the target acceleration/deceleration of the preceding vehicle and subtracting the acceleration/deceleration corresponding to the first target value from the added value; and the second target value.

12. The vehicle travel control apparatus of claim 10, wherein, when the acceleration/deceleration state of the preceding vehicle is a deceleration state, the controller corrects the second target value to a median value among three values, the three values including 0; a value obtained by subtracting the predetermined value from the target acceleration/deceleration of the preceding vehicle and further subtracting the acceleration/deceleration corresponding to the first target value from the subtracted value; and the second target value.

13. The vehicle travel control apparatus of claim 1, wherein
the preceding vehicle acceleration/deceleration information is determined based on one or more of:
a target value for the acceleration/deceleration of the preceding vehicle, an actual acceleration/deceleration value of the preceding vehicle, or a combination thereof;
a target drive force or a target braking force, a target drive torque or a target braking torque, positional information of the preceding vehicle, speed information of the preceding vehicle, or a combination thereof; and
a throttle position or a brake position of the preceding vehicle.

14. A vehicle travel control apparatus, comprising:
a sensor that obtains preceding vehicle information representing a status of a preceding vehicle;
a communication apparatus that obtains preceding vehicle acceleration/deceleration information, which is generated in the preceding vehicle, via communication with the preceding vehicle; and
a controller programmed to:
control acceleration/deceleration of the host vehicle based on the preceding vehicle information and the preceding vehicle acceleration/deceleration information,
cause the host vehicle to accelerate with the acceleration whose magnitude is less than that of the preceding vehicle according to a travel scene at that time when the preceding vehicle accelerates under a situation where the preceding vehicle and the host vehicle travel in a stable travel state, and
cause the host vehicle to decelerate with the deceleration whose magnitude is less than that of the preceding vehicle according to a travel scene at that time when the preceding vehicle decelerates under the situation where the preceding vehicle and the host vehicle travel in a stable travel state.

15. The vehicle travel control apparatus of claim 14, wherein
the preceding vehicle acceleration/deceleration information is determined based on one or more of:
a target value for the acceleration/deceleration of the preceding vehicle, an actual acceleration/deceleration value of the preceding vehicle, or a combination thereof;
a target drive force or a target braking force, a target drive torque or a target braking torque, positional information of the preceding vehicle, speed information of the preceding vehicle, or a combination thereof; and
a throttle position or a brake position of the preceding vehicle.

* * * * *